CARRIER SYSTEM SIGNALLING AND SYNCHRONIZATION

Filed Dec. 26, 1962 3 Sheets-Sheet 1

INVENTORS
ROBERT J. MARTIN
ROBERT L. WEEKS
BY
C. A. Gulbrandsen
ATTY.

CARRIER SYSTEM SIGNALLING AND SYNCHRONIZATION

Filed Dec. 26, 1962 3 Sheets-Sheet 2

INVENTORS
ROBERT J. MARTIN
ROBERT L. WEEKS
BY C. A. Sullivan
ATTY.

CARRIER SYSTEM SIGNALLING AND SYNCHRONIZATION

Filed Dec. 26, 1962 3 Sheets-Sheet 3

INVENTORS
ROBERT J. MARTIN
ROBERT L. WEEKS
BY C. A. Gulbrandsen
ATTY.

United States Patent Office 3,210,666
Patented Oct. 5, 1965

3,210,666

CARRIER SYSTEM SIGNALLING AND SYNCHRONIZATION

Robert J. Martin, New Westminster, British Columbia, and Robert L. Weeks, North Vancouver, British Columbia, Canada, assignors, by mesne assignments, to Automatic Electric Laboratories, Inc., Northlake, Ill., a corporation of Delaware Filed Dec. 26, 1962, Ser. No. 247,248
4 Claims. (Cl. 325—64)

The invention relates to carrier systems and in particular to synchronization and signalling in carrier systems.

When the modulating carrier and the demodulating carrier differ in frequency, a problem of distortion results. If there is a substantial difference of frequency, the transmitted intelligence is virtually destroyed.

Another problem relating to carrier systems is that of signalling. It is well known to use a transmitted carrier, either high level or low level, for signalling. A high level carrier, however, may introduce further problems, such as overloading of radio equipment and causing crosstalk.

Carrier systems have been designed to solve the problem of synchronization. In one such system, two pilot frequencies are utilized to derive the modulating carrier, then transmitted along with the side band or side bands and again utilized to derive the demodulating carrier. Such a system requires additional pilot frequency generators, modulators and demodulators. Other carrier systems have been designed with the problems of signalling in mind. Generally, such systems transmit pulses of energy for the purpose of signalling. Some such systems employ the carrier for modulation and signalling and then utilize some other means for synchronization.

It is the object of the invention to provide a novel and improved carrier system.

It is a more particular object of the invention to provide a most economical carrier system which employs the same carrier frequency for modulation by the intelligence to be transmitted, for signalling, and for synchronization.

Other objects and the features of the invention will become apparent from the following description and the accompanying drawings.

Briefly, the invention relates to a carrier system which employs an attenuated carrier for signalling and synchronization and the same carrier at a normal level for modulation and demodulation. As a result of carrier synchronization, the same carrier frequency is used for modulation and demodulation at both carrier terminals.

Figure 1:
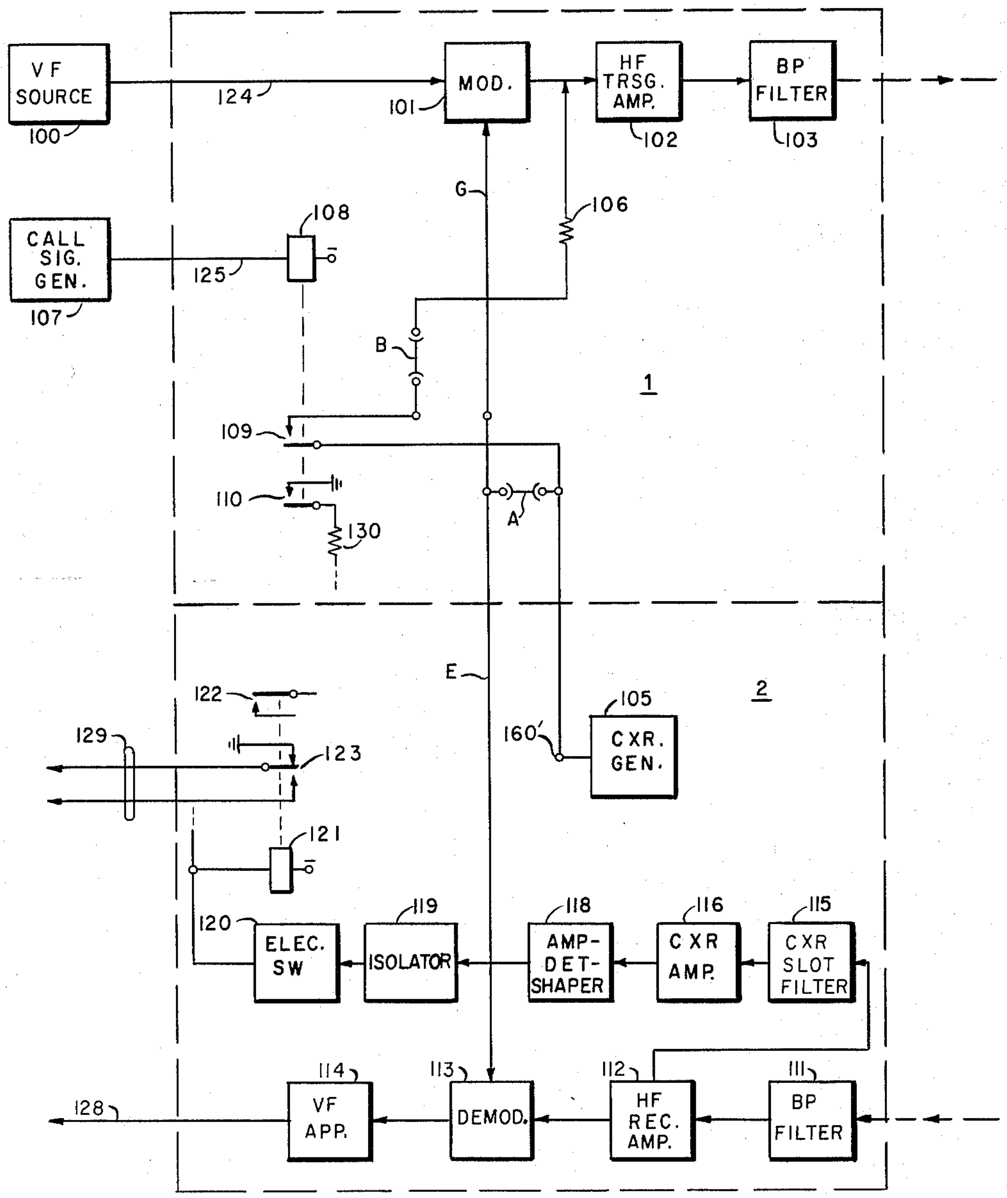
FIG. 1 is a schematic representation of a two-way carrier terminal having a transmitting and a receiving channel without synchronizing means. This terminal may be used, for example, at a master station.
Figure 4:
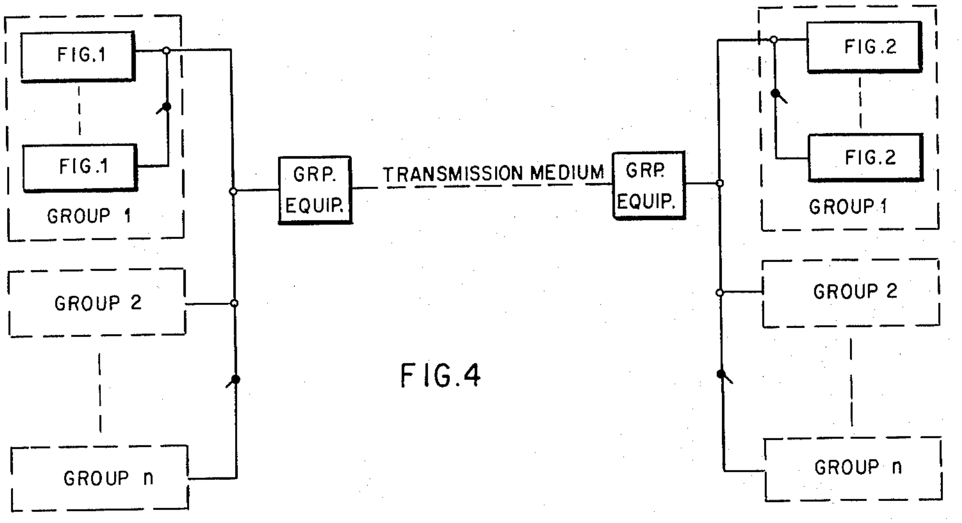
FIG. 4 is a schematic representation of a carrier system having a plurality of carrier groups at each carrier facility.

Referring to FIG. 1, the modulator 101 in the transmission channel 1 receives voice frequency signals from source 100 and call signals from generator 107 in the central office and receives carrier from the carrier generator 105. The call signal generator provides supervisory signals; for example, on-off-hook conditions and the repeating of dial pulses or the like. The voice frequency source may be equipment coupled to a telephone subset or some type of tone source, such as used in data transmission. The output of the transmission channel 1 is connected either directly to a transmission medium or to a transmission medium including group equipment, such as shown in FIG. 4. It should be noted that the transmission medium may be adapted to employ either radio program equipment or a wire transmission network.

Figure 2:
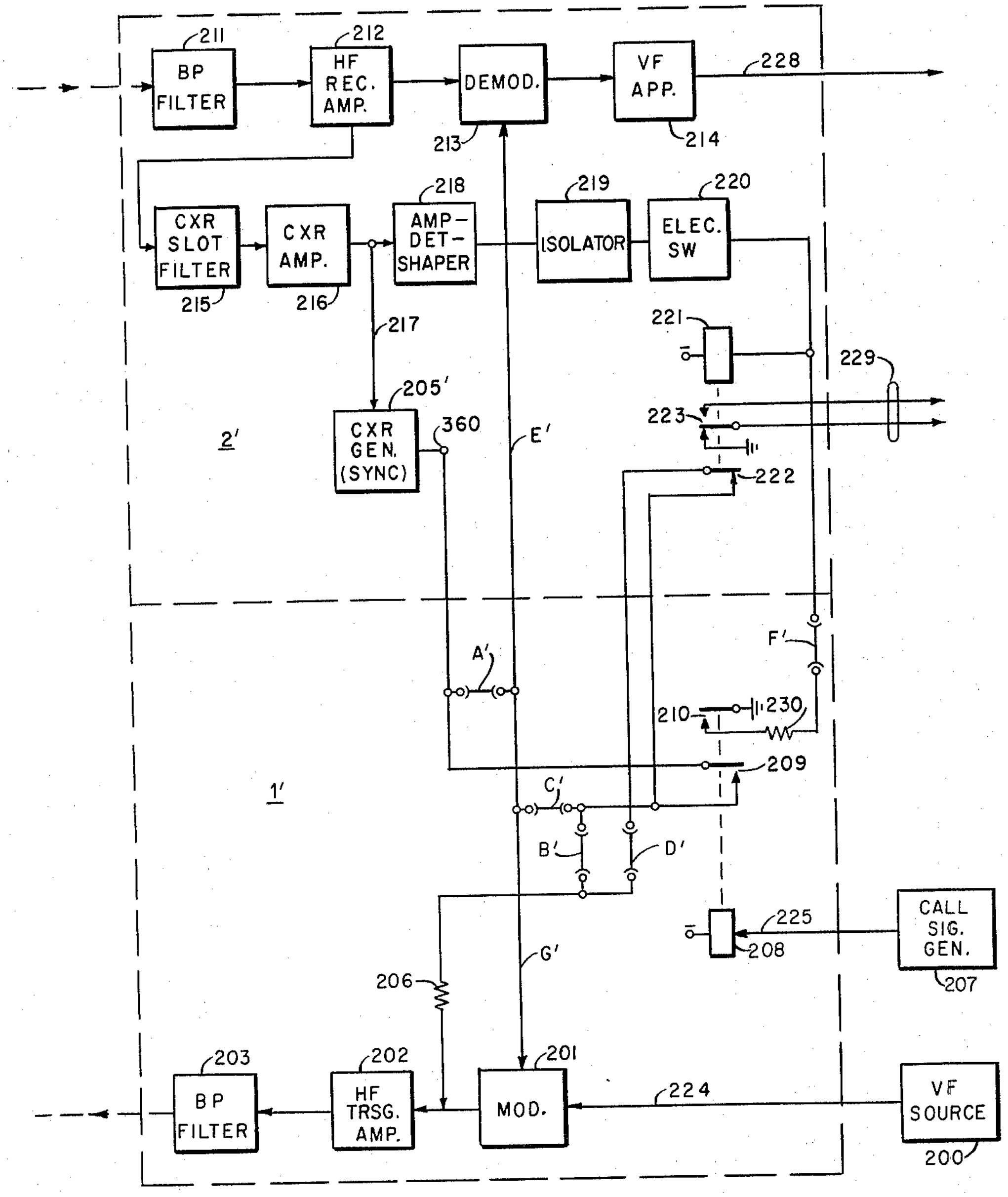
FIG. 2 is a schematic representation of a synchronized two-way carrier terminal having a transmitting and a receiving channel.

Referring to FIG. 2, the receiving channel 2′ accepts signals either directly from the transmission medium or from group equipment of the transmission medium and obtains carrier signals from the carrier generator 205′. The outputs 228 and 229 of the receiving channel 2′ are connected to another central office and provide voice frequency and calling signals, respectively, to that central office. It will be noted that the receiving channel 2 is similar to receiving channel 2′. Carrier generator 205′ also has an input connection 217 from the carrier amplifier 216 of the receiving channel 2′ for the purpose of synchronization, as will be explained below. Carrier generator 105 has been shown to be in the receiving channel 2 and carrier generator 205′ has been shown to be in the receiving channel 2′ for illustration only. It can be seen from the connections that the carrier generators are common to the terminal transmitting and receiving channels.

Figure 3:
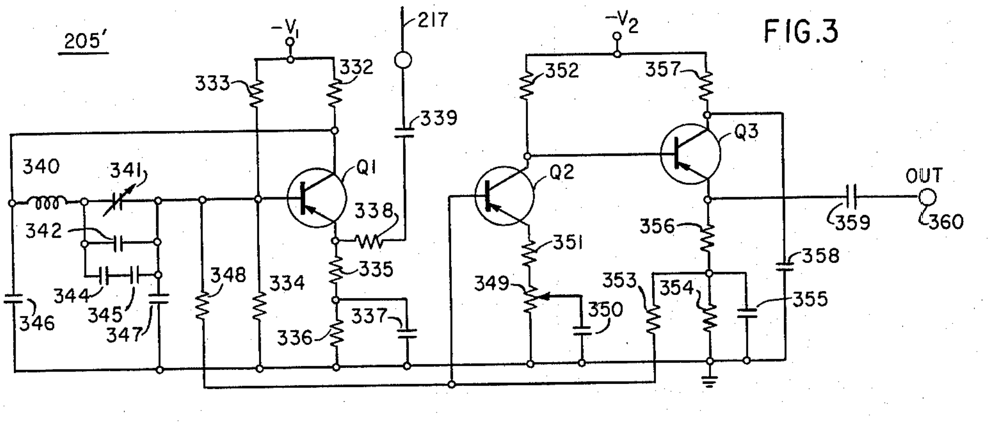
FIG. 3 is a circuit diagram of a carrier generator having a synchronization input connection.

Referring to FIG. 3, a three stage carrier frequency generator is shown employing a modified Colpitts oscillator having transistor Q1 as its active element. Inductor 340 and capacitors 341 and 342 form a series resonant mesh which determines the frequency of the oscillator. Capacitors 344 and 345 form a compensating element to stabilize frequency with temperature. The oscillator stage is fed from a regulated direct current supply for good level stability. An input of 1.5 v. R.M.S. from connection 217 to the emitter of transistor Q1 by way of coupling capacitor 339 and resistance 338, is capable of pulling the oscillator as far as 100 cycles, that is, the input voltage of carrier frequency on connection 217 will be regenerative (or degenerative as the case may be) to effect a change in the free-running frequency of oscillation, which is determined by the series resonant mesh. The output of the oscillator is taken by way of resistance 348 and applied to the base of transistor Q2, which with its associated elements forms a buffer amplifier stage. The gain of the buffer amplifier stage is varied by the resistance 349 which changes the amount of emitter degeneration. The output of the oscillator stage and the output of the buffer amplifier stage are connected to the emitter and base circuit of transistor Q3, respectively. Transistor Q3 is connected in an emitter follower configuration having its output taken across resistance 356 and coupled through capacitor 359 to output terminal 360. Referring back to FIG. 2, output terminal 360 is shown for the carrier generator 205'. A carrier generator that is similar to carrier generator 205', without the input connection 217, may be used for carrier generator 105. Therefore, a similar output terminal 160' can be seen at the output of carrier generator 105.

Referring to FIG. 4, groups 1 to *n* including a plurality of carrier terminals, such as shown in FIGS. 1 and 2, are interconnected by a transmission medium. Group equipment, well known in the art, is used to transpose the frequency of transmission by modulation of a second or group carrier and will include group modulator units, group demodulator units and carrier generators having a frequency different from the frequency used in the individual channels. The operation of group equipment is well known and further discussion of such is not needed to describe the invention.

Figure 5:
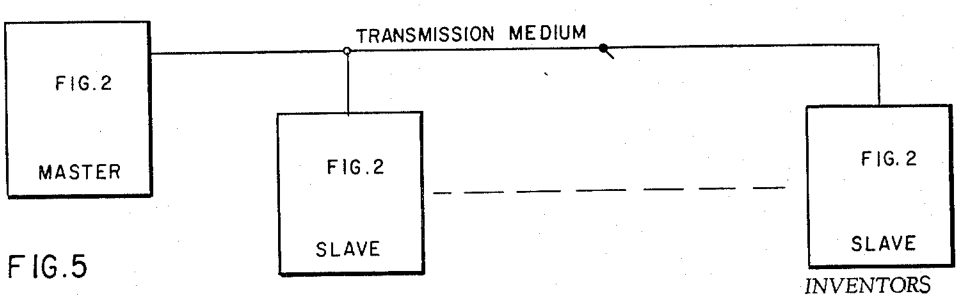
FIG. 5 is a schematic representation of a party line carrier system employing the carrier terminal equipment described in FIG. 2.

Referring to FIG. 5, a party line carrier system of a plurality of carrier terminals, such as shown in FIG. 2, are connected together through a transmission medium.

In a working system, the carrier terminals that are shown in FIGS. 1 and 2 are substantially of the same circuitry. The different optional connections are to be used as required in specific situations. To explain the operation of the system, it is assumed that the solid strap connections A and B are made at transmitting channel 1 and the connections A' and B' are made in the transmitting channel 1'. These strap connections are made for direct toll operation. The other strap connections will be explained in connection with party line operation.

*Signalling by attenuated carrier*

Referring to FIGS. 1 and 2, connected in a carrier system such as shown in FIG. 4, and assuming direct toll operation, call signal generator 107 conditions the system for signalling by energizing relay 108 by way of input 125 closing contacts 109 and 110. The carrier generator 105 (already operating) then supplies carrier from terminal 160' to the transmitting amplifier 102 by way of contacts 109, strap B, and attenuator 106. Carrier is also supplied to the modulator 101 and the demodulator 113 of receiving channel 2 by way of strap A and leads G and E, respectively. The carrier signal is then amplified by the high frequency transmitting amplifier 102 and passed through the band pass filter 103 and by way of the group equipment and transmission medium to the receiving channel 2'. The received carrier is utilized to operate an electronic switch 220 after being passed through and amplified by the band pass filter 211, the high frequency receive amplifier 212, carrier frequency slot filter 215, carrier frequency amplifier 216, the amplifier-detector-shaper circuits 218, and the isolator circuit 219. The output of the electronic switch 220 energizes relay 221 opening contacts 222 and making the transfer at contacts 223. The transfer at contacts 223, which are connected to a central office by way of connections 229, is used to signal the next following equipment. The receiving terminal 2' has now been seized. The call signal generator 107 will then proceed to alternately de-energize and energize relay 108, thereby opening and closing the carrier path at contacts 109. The de-energization and energization of relay 108 will effect a corresponding action of relay 221 at the receiving channel 2', alternately breaking and making the contacts 223 to signal the following equipment. After signalling is completed, the relays 108 and 221 will stay energized by the off-hook condition of the input 125. A continuous carrier will then be transmitted by way of contacts 109 as long as input 125 remains in an off-hook condition.

When the called station that is served by the central office goes off-hook to answer the call, call signal generator 207 gives an off-hook condition to connection 225 and energizes relay 208. Carrier from generator 205' is supplied to the transmitting amplifier 202 by way of contacts 209, strap B' and attenuator 206. The carrier is transmitted to the receiving channel 2 and effects energization of relay 121.

*Synchronization*

Still assuming direct toll operation and referring again to FIGS. 1 and 2, when the relay 108 is first energized by an off-hook condition of input 125, carrier is supplied to the transmitting amplifier 102, transmitted to the receiving terminal, and received by the receiving channel 2' as just described. At the receiving terminal, carrier frequency amplifier 216 has an output connection 217 to the carrier generator 205'. The carrier received at the terminal locks or synchronizes the carrier generator 205' by the connection 217 to the frequency of the carrier generator 105. The carrier output of the carrier generator 205' is connected to the demodulator 213 by way of strap A' and connection E' and to modulator 201 by way of strap A' and connection G'. The frequency of carrier generator 205' will correspond to the frequency of carrier generator 105 and stay in synchronization over a relatively wide variation of frequency. The generator shown in FIG. 3 is designed to be pulled + or − 100 c.p.s. from the free running carrier frequency. If the master (no synchronization connection) terminal is the initiating terminal of a call, synchronization will begin upon seizure of the receive relay at the slave (synchronized) terminal and synchronization will momentarily be lost due to the opening and closing of contacts 109. However, synchronization is restored immediately when signalling is completed. If the slave terminal initiates a call, the answer carrier from the master terminal will immediately synchronize the carrier generator at the slave terminal.

*Intelligence transmission*

Referring again to FIGS. 1 and 2, assume that input 125 is in an off-hook condition and direct toll signalling has taken place. Also assume that the following switching equipment has made the proper connections and readied the system for voice frequency transmission. Carrier is being supplied to the modulator 101 by way of strap A and connection G. Carrier is also being supplied to the demodulator of the same terminal by way of strap A and connection E. Synchronized carrier is supplied to the modulator 201 by way of strap A' and connection G' and to the demodulator 213 by way of strap A' and connection E', as just described. A similar condition will exist if input 225 is put in an off-hook condition energizing relay 208 and closing contacts 209, with the exception that carrier generator 205' will be free-running until synchronized by an answer carrier from generator 105 of transmission channel 1.

Voice frequency signals from the voice frequency source 100 are introduced into the modulator 101 of transmission channel 1 by input 124. The modulator 101 also includes voice frequency equipment such as a balanced transformer, a limiter circuit, attenuators and filters. Modulators 101 and 201 are balanced and suppress the normal level carrier. After modulation, both side bands are then amplified by the high frequency transmitting amplifier 102, along with the attenuated synchronizing carrier, and passed to the band pass filter 103, which suppresses one of the side bands and allows transmission of the other side band and the attenuated carrier to the receiving terminal by way of the transmission medium.

The intelligence or modulated carrier is received by the band pass filter 211 and amplified by the high frequency amplifier 212. The intelligence is then demodulated in the demodulator 213 by the synchronized carrier of generator 205'. The voice frequency signal output of the demodulator is then fed through voice frequency apparatus 214, which includes amplifiers, to the central office.

Synchronized carrier is being supplied from the carrier generator 205' to the modulator unit 201 and the transmitting amplifier 202, as previously described. Voice frequency input signals from the voice frequency source 200 by way of inputs 224 modulate the synchronized carrier in the modulator unit 201 and are transmitted to the carrier receiving channel 2 in the same manner that modulated carrier was transmitted from the transmission channel 1 to the receiving channel 2'. The incoming intelligence to the received channel 2 will then be demodulated, as previously described for the receiving channel 2'. It can be seen from the above description that the voice frequency input signals at one terminal and the voice frequency output signals at the other terminal are the same because of the end to end synchronization.

During the previous discussions, mention was made to straps A, A', B and B'. The straps A' and B' are optional connections with straps C' and D'. The previous discussions were directed to direct toll operation; the respective optional connections should be used with party line operation. Referring to FIG. 2 in both master and slave locations and considering contacts 209 and 210 normally open when idle or on-hook, the system of FIG. 5 would operate as follows.

At the master location, the call signal generator 207 conditions the system for signalling by energizing relay 208 by way of input 225 closing contacts 209 and 210. The carrier generator 205' (already operating) then supplies carrier from terminal 360 through contacts 209 and 222 of the signalling relays 208 and 221 respectively and then via strap D' and attenuator 206 to the transmitting amplifier 202. Carrier is also supplied to the modulator 201 and the demodulator 213 from the terminal 360 via contacts 209 of transmit relay 208, straps C' and leads G' and E' respectively.

At all slave locations the received signal will activate electronic switch 220, energize relay 221, make the transfer at contacts 223 and open contact 222. The dial pulses of the master terminal call signal generator 207 will be reproduced by the slave terminal receive relay contacts 223 which are connected to office call equipment by way of connections 229. After signalling is completed, master terminal transmit relay 208 and slave terminal receive relay 221 remain energized by the off-hook condition of the master terminal call signalling generator 207 which maintains the sending of a continuous carrier signal from the master terminal.

It should be noted that the slave terminal carrier generator is synchronized to the master terminal frequency in the same manner described in toll operation.

When the called party (a slave terminal) goes off-hook to answer the call, that particular call signal generator 207 energizes relay 208 through connection 225 and thereby applies carrier to modulator 201 and demodulator 213 via contacts 209 and strap C'. This permits a voice answer only as the already open contacts 222 of receive relay 221 prevents the sending of the signalling carrier back toward the master station. The answer is, therefore, one of voice transmission.

Open contacts 222 resulting from the seizure of the receive relays at the slave terminal prevent all other parties from interrupting this call by trying to dial in. Furthermore, multi-carrier tone loading of the transmission facility is prevented during a conference type call.

It should be noted that carrier cannot be supplied to the demodulator 213 or to the modulator 201 unless there is an off-hook condition on connection 225 to energize relay 208 and close contacts 209. Such an arrangement prevents operation of any signalling receive relay during idle conditions which would occur if the addition of carrier leak from several sources was permitted.

A second set of contacts 210 on the transmit relay 208 provides a ground on the receive relay 221 through resistance 230 and strap F', which will hold the receive relay operated and contacts 222 open if it has been initially energized by a received carrier signal. This feature is used in party line applications where carrier synchonization is desired. The arrangement prevents carrier generator hunting for a synchronizing frequency from the plurality of frequencies which may otherwise be available from other slave terminals when the master terminal of the system goes on-hook in a multi-party call leaving all other terminals in the system still in the off-hook condition.

Changes and modifications may be made without departing from the spirit and scope of the invention and should be included in the appended claims.

What is claimed is:

1. A carrier system comprising a transmission medium and first and second carrier terminals interconnected by said medium, each said terminal having control signal generating and reproducing means, a transmitting path, including a modulator, connected to said medium and a receiving path, including a demodulator, connected to said medium, and a carrier generator common to said transmitting and receiving paths, means at each said terminal governed by said control signal generating means for controlling the connection of said carrier generator to said transmitting path independently of said modulator for transmitting carrier frequency supervisory signals to the other terminal, carrier frequency filter and amplifier means at each said terminal connected to the receiving path independently of said demodulator and having an output connection to said control signal reproducing means, said carrier frequency filter and amplifying means at one of said terminals having an additional output connection to the carrier generator of said one terminal for synchronizing said generator to the frequency of the carrier generator of the other terminal.

2. In a carrier system including a calling carrier terminal and a plurality of called carrier terminals, said terminals interconnected by a transmission medium, each said terminal having a free-running carrier generator, and means for transmitting said carrier by way of said transmission medium, each of said plurality of called terminals comprising: a first switching means operated in response to an off-hook condition at the called terminal, a second switching means operated in response to the receipt of said transmitted carrier, and a connection between said carrier generator means and said transmitting means which is jointly controlled by said first and second switching means so that said called terminals are prevented from transmitting carrier when said second switching means thereof has operated in response to the receipt of said carrier signal.

3. In a carrier system, the combination as claimed in claim 4, wherein said plurality of called terminals each includes means for synchronizing its carrier generator to the frequency of said carrier generator of said calling terminal and wherein said first switching means has a set of contacts connected to said second switching means, said contacts closing upon operation of said first switching means thereby keeping said second switching means operated after said second switching means has been initially operated by receipt of a carrier signal, so that when said calling terminal terminates the transmission of carrier in a multi-terminal call, said carrier generators of said called terminals will be prevented from hunting a frequency of operation and will return to the free-running carrier frequency.

4. In a carrier system including first and second carrier terminals interconnected by a transmission medium, each said terminal having a carrier generator and the carrier generator of said second terminal having a synchronization input, call signal generator means, and means for signalling said second terminal and for synchronizing the carrier generator thereof to the frequency of the carrier generator of said first terminal, said signalling and synchronization means comprising: transmitting means at said first terminal having an input and an output, said output coupled to said transmission medium through band pass filter means; attenuation means at said first terminal connected between the carrier generator thereof and said input of said transmitting means; relay means at said first terminal responsive to said call signals, said relay means having a set of contacts interposed between said attenuation means and said first terminal carrier generator; receiving means at said second terminal having an input coupled to said transmission medium by way of band pass filter means and having a plurality of outputs; carrier frequency amplifier means coupled to one of said outputs of said receiving means by way of carrier frequency filter means and having an output terminal; amplifier-detector-shaper means having an input and an output, said input connected to said output of said carrier amplifier means; isolator means having an input and an output, said input connected to said output of said amplifier-detector-shaper means; switching means including a first switching means having an input and an output, said input connected to said output of said isolator means, and relay means connected in said output of said first switching means, said relay means having contacts for reproducing said call signals; and a connection from said output of said carrier amplifier means to said synchronization input of the carrier generator of said second terminal whereby said carrier generator is synchronized to the frequency of said first terminal carrier generator.

References Cited by the Examiner

UNITED STATES PATENTS

| | | | |
|---|---|---|---|
| 1,658,856 | 2/28 | Potter | 325—49 |
| 1,797,284 | 3/31 | Coram | 325—50 |
| 2,836,724 | 5/58 | Kaminow | 331—117 |
| 2,871,294 | 1/59 | Stachiewicz | 325—49 |
| 2,903,651 | 9/59 | Hahnel | 331—117 |
| 2,974,222 | 3/61 | Lawson | 325—20 |
| 3,042,867 | 7/62 | Thompson | 325—50 |

OTHER REFERENCES

Chance et al.: Waveforms, McGraw-Hill, 1949, pp. 220–223, 586–588.

Knowles: Electronic Industries, August 1958, pp. 55–60.

DAVID G. REDINBAUGH, *Primary Examiner.*